(No Model.)
S. G. RANDALL.
MORTISE CUTTER.
No. 321,853. Patented July 7, 1885.
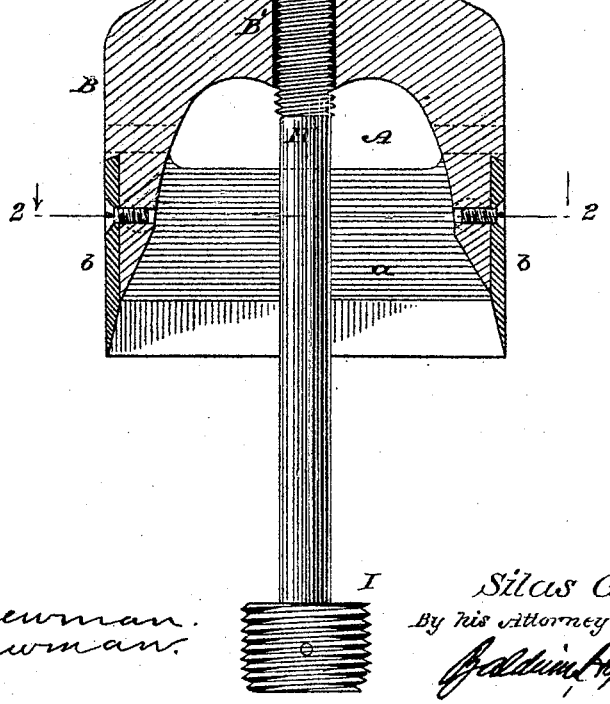
WITNESSES
Ed. A. Newman.
Al. C. Newman.
INVENTOR
Silas G. Randall,
By his Attorneys

UNITED STATES PATENT OFFICE.

SILAS G. RANDALL, OF GREENE, NEW YORK, ASSIGNOR TO AMELIA A. RANDALL, OF SAME PLACE.

MORTISE-CUTTER.

SPECIFICATION forming part of Letters Patent No. 321,853, dated July 7, 1885.

Application filed April 11, 1885. (No model.)

*To all whom it may concern:*

Be it known that I, SILAS G. RANDALL, of Greene, in the county of Chenango and State of New York, have invented certain new and useful Improvements in Mortise-Cutters, of which the following is a specification.

My invention relates to wood-cutting tools of the class used in forming polygonal openings or mortises.

My object, mainly, is to provide means whereby the cutting portion of a mortising-tool may be securely centered or properly adjusted for work and forcibly fed to cut the walls or define the boundary of the desired mortise or like opening.

The subject-matter claimed will hereinafter be designated by the claims, after first describing a tool embodying my improvements in suitable way by the aid of the accompanying drawings, in which—

Figure 1 is a vertical longitudinal section, partly in elevation, of my improved tool. Fig. 2 is a transverse section on the line 2 2 of Fig. 1. Fig. 3 is a plan view of a device for securing together two sections of a sleeve which carries the cutting portion of the tool.

As in this instance shown, a reciprocating non-rotating rectangular cutter, A, is employed; but obviously a reciprocating non-rotating polygonal cutter may be employed, of any desired and suitable form. The cutter is hollow, being shown as formed of four blades or cutter-sections—two side or long cutters, *a a*, and two end or shorter cutters, *b b*. These cutters are secured in suitable way—as by screws and dovetail seats—to a reciprocating non-rotating stock or cutter-head, B. This hollow head projects above the level of the cutters and is open at top, except at the cross-bar or bridge portion B', in order to render the tool self-clearing and avoid clogging. An upward extension or shank, C, of the cutter-head is made hollow, to constitute a tube or long sleeve centrally over the hollow or space included between the cutter-blades. A screw-nut or reciprocating non-rotating upper tubular section, D, provided with an internal screw-thread, *d*, has connection with the cutter, being shown as detachably secured to the main section or shank portion C of the cutter-tube. The upper end of the shank portion C of the tube and the lower end of the nut or upper portion, D, of the tube are provided with abutting flanges *c e*, respectively, and a sectional holding-socket, E, composed of two hinged portions, and provided with a clamp-screw, F, serves to detachably hold the tube-sections together. The socket-sections are formed with an internal annular groove, *f*, to receive and hold the annular shoulders or abutting flanges of the tube-sections, as will readily be understood. The threaded upper section or nut, D, of the cutter-connected tube is provided with a handle, G, such as augers are ordinarily provided with. Means for holding or anchoring the cutter when being operated, as in this instance provided, is as follows: An anchoring-rod and cutter-feeding screw, H, passes through the cutter-attached tube. The thread of the screw-rod engages the thread of the tube section or nut D, and at its lower end the screw-rod is provided with a screw, I, for holding or anchoring the tool, as presently to be fully described. At its upper end the screw-rod is provided with a detachable handle, J.

In the operation of my improved tool, the mortise having been partially formed by boring the proper number of holes with an auger, essentially as though a chisel were to be used to finish the work in the ordinary way, a central hole is provided in the bottom of the partially-cut mortise sufficiently deep and of proper diameter to enable the tool to be firmly anchored in position by screwing the holding-screw I into this hole by turning the handle J. Next the handle G is turned, and, by way of the nut D, the cutter is forcibly fed down and positively controlled, being truly guided as well as fed along the feeding and anchoring rod. In this way the walls or boundaries of the mortises are quickly and accurately cut. When the material is to be cut entirely through, a bottom piece may be adjusted under the point where a mortise is to be cut and the anchoring-screw made fast to this piece; or a block or cross-bar might be rested upon the top or shoulder of the anchoring-screw, and bear against the under side of the piece being cut during the working of the tool.

I have described only an internal anchoring device, because I deem it far preferable to means for anchoring the tool arranged externally.

I do not wish to be understood as confining my invention to the precise details of arrangement shown in the drawings and above specifically described, as my improvements may be modified in various ways without departure from my invention.

I claim as of my own invention—

1. The combination of the reciprocating non-rotating hollow cutter and the anchoring-rod passing through the cutter and adapted to be secured to the material being cut, substantially as and for the purpose set forth.

2. The combination of the reciprocating non-rotating hollow cutter, the cutter-tube, and the anchoring-rod passing through the cutter-tube, and with which the cutter has reciprocating connection, substantially as and for the purpose set forth.

3. The combination of the reciprocating non-rotating cutter, the sectional cutter-tube, the feeding and anchoring rod, and the handle secured to the threaded section of the cutter-tube, substantially as and for the purpose set forth.

4. The combination of the hollow cutter, its sectional tube, the threaded feeding and anchoring rod engaging with the threaded section of the cutter-tube, the anchoring-screw, the handle secured to the threaded section of the cutter-tube, and the handle of the feeding and anchoring rod, substantially as and for the purpose set forth.

5. The combination of the reciprocating non-rotating hollow cutter-head, having the bridge portion at top, and the cutters detachably secured to and around the head below its bridge portion, and arranged as described, to form a polygonal cutter, for the purpose set forth.

In testimony whereof I have hereunto subscribed my name.

SILAS G. RANDALL.

Witnesses:
E. C. DAVIDSON,
NELLIE HOLMES.